Dec. 27, 1966  N. DE BENEDETTI  3,293,980
DEVICE FOR DETECTING THE ANGULAR POSITION OF A LUMINOUS SOURCE
Filed Sept. 15, 1965  10 Sheets-Sheet 9

Fig. 9

# United States Patent Office 3,293,980
Patented Dec. 27, 1966

3,293,980
DEVICE FOR DETECTING THE ANGULAR
POSITION OF A LUMINOUS SOURCE
Neri De Benedetti, Rome, Italy, assignor to Bombrini
Parodi-Delfino Societa per Azioni
Filed Sept. 15, 1965, Ser. No. 487,448
Claims priority, application Italy, Oct. 26, 1960,
18,455/60
5 Claims. (Cl. 88—14)

This application is a continuation-in-part of my application Ser. No. 144,944, filed Oct. 13, 1961, entitled Device for Detecting the Angular Position of a Luminous Source, now abandoned.

The present invention refers to a system for taking the angular bearing of a pulse-modulated light source, preferably in the infrared band, in reference to a system of orthogonal coordinated lying on a plane perpendicular to the optical axis of a training telescope, said system being characterized in that the aforesaid bearing angular coordinates are obtained directly in digital form (according to a 6-digit binary code) so as to allow their direct utilization for feeding a computer capable of digitally processing the data required to control a moving vehicle, (for instance, a missile) carrying said light source, by means of suitable control signals adapted to maintain the vehicle steadfastly on the extension of said training optical axis.

There are many possible ways to obtain in a suitable optical device signals depending on the angular position of a point-like body emitting its own or reflected light energy.

Some of these devices obtain such signals by carrying out, on the focal plane of the optical device, mechanical modulations in the intensity of image spot.

Such modulations can be, as usually in the art, amplitude, frequency or phase modulations. In all the three cases, the information which is obtained in dependence on the position of the image spot on the focal plane of the instrument is of "analogical" type.

Its possible subsequent conversion to digital form, besides making necessary a special conversion apparatus, does not obviously modify the characteristics which are proper to the analogical systems, as far as the zero drift, and the resolution loss depending on the noise present in the primary photo-detectors and particularly on the external noise invariably present together with the available signal, which in the technical literature is called background noise is concerned.

Such a noise, conjointly with the fluctuations in intensity of the image light spot, depending on the atmospheric turbulence and on the resulting variation in the absorption coefficient, modulates the amplitude, phase and frequency of the available signal thus generating a corresponding loss in resolution for those informations which are just dependent on the amplitude, phase or frequency of the light signal.

Moreover, it is well-known that the background noise is the higher, any other condition being equal, the greater is the aperture of the optical system, or for a given focal, the greater is the diameter of the inlet lens. Unfortunately the hereinabove mentioned systems necessitate, to operate at the greatest ranges, the largest apertures available, so that the increase in aperture of the optical system does not generally cause any improvement in the signal-to-noise ratio.

The present invention does not utilize any of the aforesaid analogical systems of modulation of the light image of the spot to be detected, and a main purpose of this invention is to provide a digital system for obtaining the information required with respect to the position of the image spot through a digital computation process of determined pulses as it will be explained in the following, thus obtaining advantages with respect to the attainable resolution and accuracy which are peculiar to the digital systems.

Another object of the present invention is to provide means which permit to operate with optical devices having a very low equivalent relative aperture in respect to the diffused light and resulting background noise, thus obtainting advantages with regard to the ratio of useful signal to said noise.

A further object of the present invention is to provide means which permit to detect only pulse light signals synchronized to a suitable pulse generator, with the purpose thereby of improving the protection of the system from the noise and from possible different light point sources which may be present in the field of vision.

The present invention, as it will be explained in the following permits to detect said angular position of a point source in the field of vision of a sight optical system, by providing also means for pulse-modulating with a low duty-cycle the light source itself (in the same way as a flash) in such a way that the peak amplitude of the light pulse is very high, yet maintaining at suitably low values the average power thereof, obtaining thereby a better gating possibility of the available signal with respect to the background noise due to the diffused light. Other objects and advantages of the present invention could appear from the following detailed description thereof.

In accordance to the present invention an arrangement is provided comprising a flash infrared light source located on the vehicle (missile); an optical unit comprising two telescopes having their respective image focal planes common and on which the point images of the aforesaid light source are formed; a quite opaque disc-like mechanical scanning device rotating on said common focal plane so as to intercept the rays coming out from said image spots except for sixteen (16) radial slits; a photo-detector device for the signal pulses passing through the above said sixteen (16) slits of the disc; an opto-electronic device generating pulse signals synchronized to the disc rotation and means for transmitting and receiving said pulses aboard the vehicle carrying the aforesaid flash source, in such a way that the light pulses emitted therefrom are synchronized to the disc rotation; a digital computing electronic device which processes and displays in digital form on a 5-digit binary code plus a sixth digit for the sign, the angular orthogonal coordinates of the position of the detected light spot, utilizing as inputs the signal pulses detected by the photo-detector device and gated by said mechanical scanning rotary disc, as well as the synchronism pulses coming out from the above-said opto-electronic generator.

In the drawings.

The figure shows also the corresponding sequence of the synchronism, reception and counting light pulses (FIG. 6B).

DETAILED DESCRIPTION

Flash lamp

Figure 1:
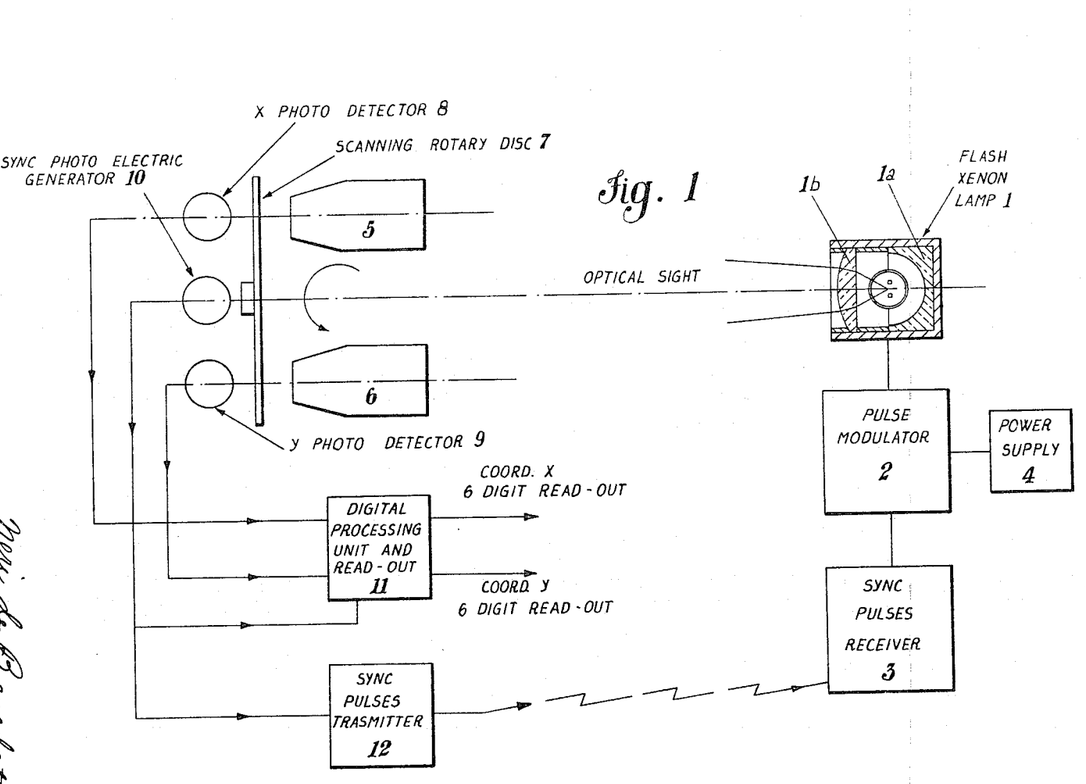
FIG. 1 is a simplified block diagram of the arrangement of the component units of the system.

In FIGURE 1 it is shown the general schematic layout of the components of the invention. In block 1 it is shown the xenon gas-filled flash lamp emitting in the near-infrared band at a wavelength of 1 micron.

A typical example of this lamp are the FX42 or FX31 lamps manufactured in U.S.A. by "Edgerton, Germeshausen and Grier Inc., Boston."

This lamp emits infrared light for a time of few microseconds (1 to 10 microsec.), if energized by a suitable discharge pulse, as it is well known in the art.

The discharge pulse is produced by a pulse modulator which, synchronized by a trigger coming from the receiver 3 causes the discharge of a capacitor across the flash lamp.

The lamp and the modulator are energized by a usual power supply 4 generating the appropriate voltages for the discharge and the trigger, for example by means of a conventional low-high voltage converter (D.C.–D.C. converter).

The infrared radiation emitted by the lamp is conveyed as a beam of suitable width (10° to 15°) through the system of spherical mirror 1a and lens 1b forming a conventional projector.

The flasher unit comprising the blocks 1, 2, 3, 4, is placed aboard the vehicle to be spotted and irradiates light energy obviously toward the telescope optical system denoted in FIGURE 1, with 5 and 6.

Receiver and transmitter

Still in FIGURE 1 it is shown the transmitter 12.

It transmits the synchronizing pulses of the flash lamp 1 deriving such pulses from the synchronism generator 10 in a way more particularly specified in the following:

The transmitter 12 is placed at the ground station together with the optical detecting system 5–6 and the computer unit 11.

The receiver 3 is situated aboard the vehicle to be spotted. It receives the synchronizing pulses transmitted by the transmitter 12 and through them acts on the pulse modulator 2 in such a way that for each pulse transmitted by the transmitter 12 there is provided an unblocking trigger of the modulator 2 and by consequence the emission of a flash pulse by the lamp 1.

The construction of the transmitter 12 and the respective receiver 3 is not critical for the present invention. A system could be a simple transmission on (telephonic) wire and in such a case the transmitter and the receiver 12 and 13 are two telephone terminals; or the system could be a VHF or UHF radio transmission and in such a case the transmitter and the receiver are VHF or UHF radio sets having a bandwidth suitable for transmitting and receiving pulses of about 10 microseconds; or the system could be a beam microwave radio transmission (of the radio link type).

All these types of transmitters and receivers are well known in the telephone and radio transmission art.

Optical unit and rotary disc

In FIG. 1 there are also shown the units 5 and 6 comprising two telescopes of given focal and aperture.

The focal could be a 135 mm. if a view field width of about 6° is desired or a 1500 mm. if a very small vision field width (0.5°) is desired.

The focal plane of the two telescopes 5 and 6 is a common one.

In said plane is placed the rotary scanning disc 7.

Figure 3:
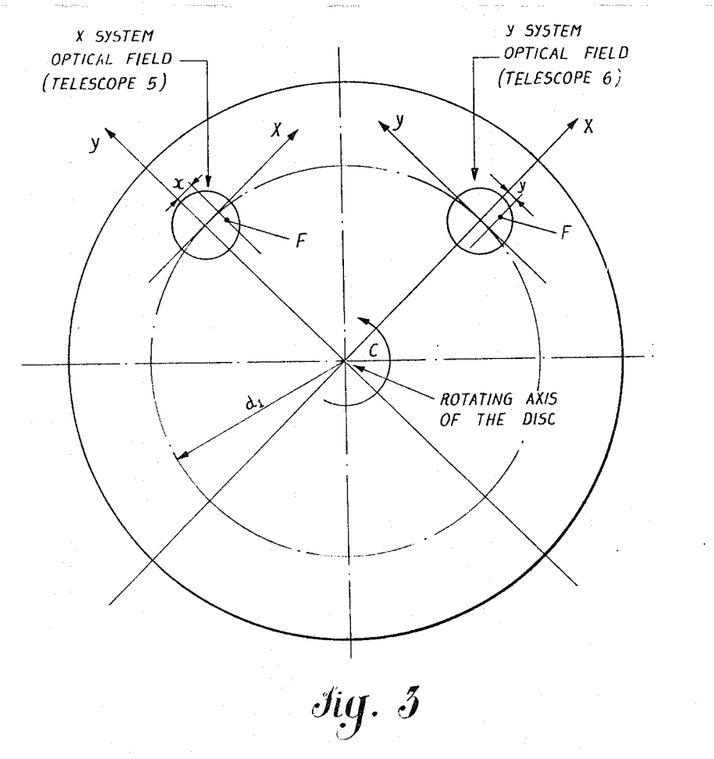
FIG. 3 is a geometrical view of the system of reference axes viewed on the focal plane of the two-telescope system.

In FIGURE 3 is shown this focal plane and it represents the system of coordinates according to which the angular coordinates $x$ and $y$ of the flash F image spot are measured.

In the figure, the two circles X and Y represent the image fields of the two telescopes centered on the corresponding optical axes.

As shown in the figure, the telescope system X, 5 of FIG. 1, has the task of measuring the coordinate $x$, and the telescope system Y, 6 of FIG. 1 has the task of measuring the coordinate $y$.

In the same figure there is shown the center of rotation of the rotary disc C; this center is positioned in such a way that the optical axes of the two telescopes, and hence the center of the relative image field, lies on two axes (namely X and Y of the coordinate system) arranged at right angle one to another and passing through the center of rotation of the disc C.

Figure 4:
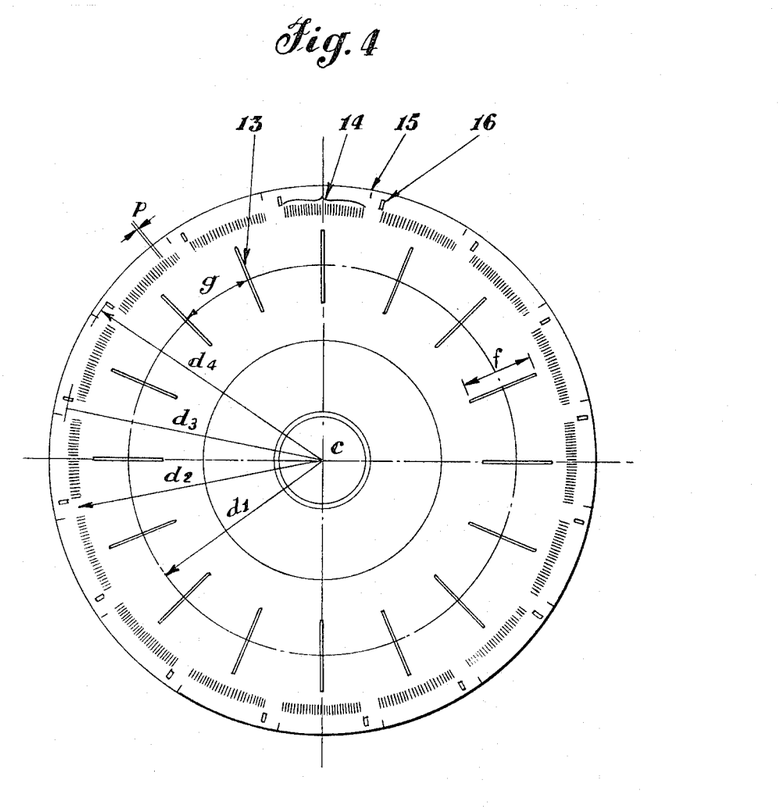
FIG. 4 is a diagrammatic view of the scanning rotary disc.

FIG. 4 is a view of the rotary scanning disc. The disc is completely opaque to the passage of the light rays except in the parts which represent slits of determined dimensions.

There are provided sixteen slits radially arranged and centered on the circumference of radius $d_1$ which is the radius on which there are also centered the centers of the image fields X and Y (FIG. 3).

The length of the sixteen slits is such as to cover the entire width of the image field $f$; between a slit and the next one it is provided an arc length $g$ exactly equal to $\frac{1}{16}$ of a round angle (22.5°), that is the slits are spaced one from another exactly by the same distance. Moreover, in the edge portion on a radius $d_2$ there are provided thirty-three additional small slits 14 radially centered and symmetrical to each of the sixteen slits 13 that is sixteen slits on the left side and sixteen slits on the right side plus a central slit radially coincident with the corresponding large slit 13.

The slits 14 have a pitch $p$ one from another which is twice their width. The width of the scanning slit 13 is 1.5 times the pitch $p$ of the thirty-three slits 14.

Still in the edge portion, on a radius $d_3$, there is provided an additional slit 16 having dimensions greater than those of the slits 14, positioned two pitches $p$ before the first slit of the type 14 and on an even greater radius $d_4$ thee is provided a slit 15 of a type similar to those shown 14 positioned one pitch $p$ after the thirty-third slit of the type 14.

Figures 6, 6A, 6B:
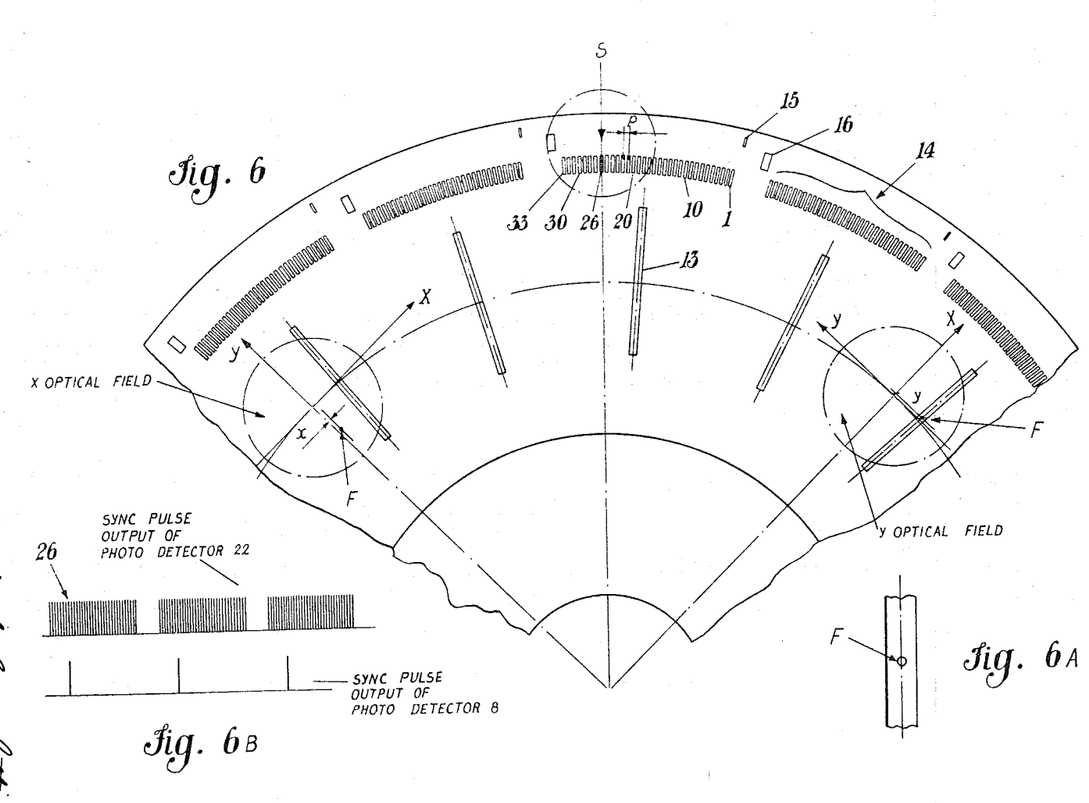
FIG. 6 is a view of the plane normal to the optical axis of the two telescopes (focal plane) and of the rotary disc stationarily placed in the position corresponding the reception of a light pulse.
FIG. 6B is a view of the corresponding sequence of the light pulse, synchronism pulses and counting pulses as attained in the example of FIG. 6.

In FIG. 6, showing an enlarged disc portion, the arrangement of the slits is more clearly visible, being the drawing enlarged.

Figure 2:
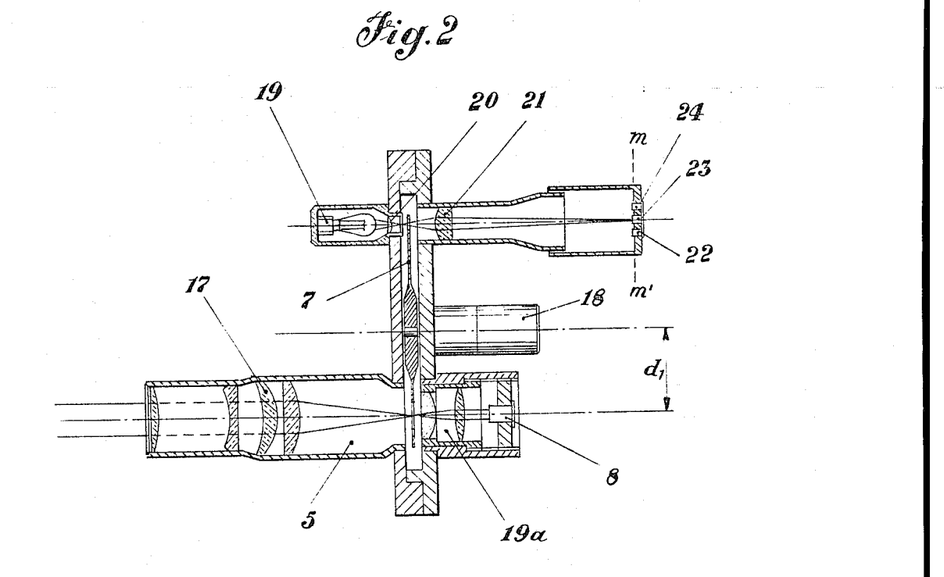
FIG. 2 is a diagrammatic view of the optical system in combination with the disc assembly and the photoelectric generator of synchronizing signals.

In FIG. 2 is clearly visible the arrangement of the rotary disc 7 and of one (5) of the two telescopes. As shown, the disc, driven by the motor 18, rotates in the focal plane of the lens system 17 and the slits 13 of the disc scan the image field sixteen times for each revolution of the disc.

The light rays passing through the disc at the slits 13 are focused on a photo-detector 8 by means of the lens unit 19A representing an optical system having the subject focus on the focal plane of the lens 17.

The systems 5 and 19A together form a telescope optics.

*Photoelectric generator of synchronism signals*

Still in FIG. 2, there is schematically drawn the photoelectric generator of synchronism pulses. It comprises a small incandescent lamp 19 the light of which focused by the condenser lens 20 illuminates the assembly of the edge slits 14, 15 and 16 of the disc 7 (FIG. 4).

The image of said illuminated slits, is projected on the cross-sectional plane $m-m'$ by the projection lens 21.

Considered the transverse magnification of the lens 21 the image of the slit 14 is projected on the photo-transistor 22; that of the slit 16 is projected on the photo-transistor 23; and the one of the slit 15 is projected on the photo-transistor 24.

As said slits rotate with the disc, the photo-transistors detect a sequence of pulses synchronized to the rotation any time their image will pass on the corresponding detector.

Figure 2A:
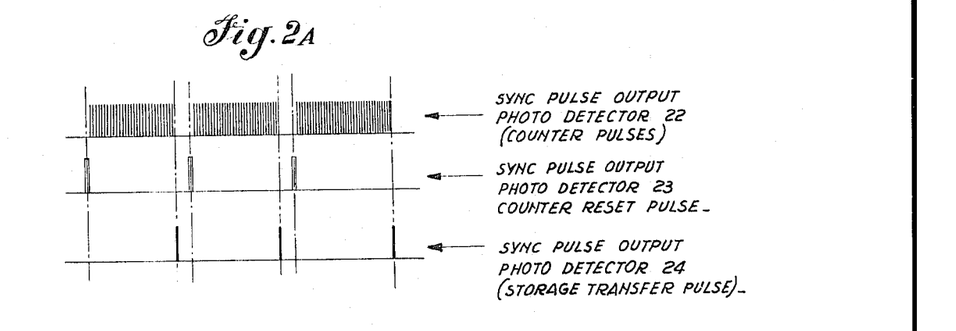
FIG. 2A is a diagrammatic illustration of the shape of the pulse waves coming out from the three photoelectric generator of the synchronism pulses.

In FIG. 2A, there is shown the sequence of the synchronism pulses generated by the device in correspondence of each of the three photodetectors.

Therefore, there are provided thirty three output pulses from the photo-transistor 22, the central seventeenth of which coincides in time exactly with the moment in which one of the sixteen scanning slits 13 passes through the optical axis of the system 5 and another one, at 90°, passes through the axis of the similar system 6.

The synchronization of said pulses is independent upon the speed of rotation of the disc, as the generation thereof is such that their relative position depends exclusively on the pattern steadily impressed on the disc 7.

Therefore, the interval between one pulse and another, corresponds exactly to an angular pitch $p$ of the disc rotation or, in other words, at each rotation of the disc corresponding to the angular pitch $p$, one output pulse from the photodetector 22 is obtained.

The output pulses from the photodetector 22 are transmitted, through the transmitter 12 (FIG. 1), to the flash device for the synchronization of the lamp, as hereinabove described.

Therefore, for any output pulse from the photodetector 22, that is for each rotation by a pitch $p$ of the disc, a flash pulse will be emitted by the lamp 1 (FIG. 1) and, by consequence, a point image forms at the same moment on the focal plane of the optics 5 and 6.

*Operation of the device*

FIG. 6 shows an enlarged portion of the rotary disc and the corresponding plane of the image fields on which the rotation of the disc takes place. With S is denoted the radial axis corresponding to the position of the synchronism pulse photo-detector.

As previously explained, each time a slit of the group indicated with 14, during the rotation of the disc, passes on the axis S, on the image field of the optical system X and Y, it appears instantaneously (duration of the flash pulse 3 to 5 microseconds) the flash point image F.

Obviously, such an image appears on said plane of the image field in a point of coordinates $x-y$ depending on the greater or lesser angular shift of the vehicle carrying the flasher with respect to the direction according to which the spotting optical system 5 and 6 (FIG. 1) has been trained.

For example, in FIG. 6, such a position has been made evident by the point F. For sake of a better clearness, the portion of the image field at the inside of F has been redrawn enlarged in FIG. 6A.

As clearly pointed out in FIGURES 6 and 6A, the sequence of the flash pulses in the image field Y is entirely blanked by the disc except for the pulse corresponding to the synchronizing pulse relative to the slits 26.

In fact, when such a slit passes through the axis S and causes the sending of said pulse, the disc and the scanning slits 13 lie in the exact position shown in the figure.

In such a position, one of the sixteen scanning slits lies in correspondence of the image spot F, which therefore is not blanked.

For a position directly before or after that under consideration by a pitch $p$ of the disc, the corresponding flash pulses are not covered by the slit, taking into account that the width of the latter has, as stated, the value of $1.5p$ if, as shows the example in FIG. 6, the image spot lies at the center of the slit at the considered moment.

In FIG. 6B there is shown the sequence of the synchronizing pulses generated by the photodetector 22 and the flash pulse that, as hereinabove stated, is received downstream the disc by the signal photodetecting device 8 of FIG. 2.

As the slits 13 of the disc are in a number of sixteen and also there are sixteen corresponding groups of the slits 14, 15 and 16 arranged along the peripheral rim of the disc, there are sixteen scanning (frames) for each revolution of the disc.

Figures 7, 7A, 7B:
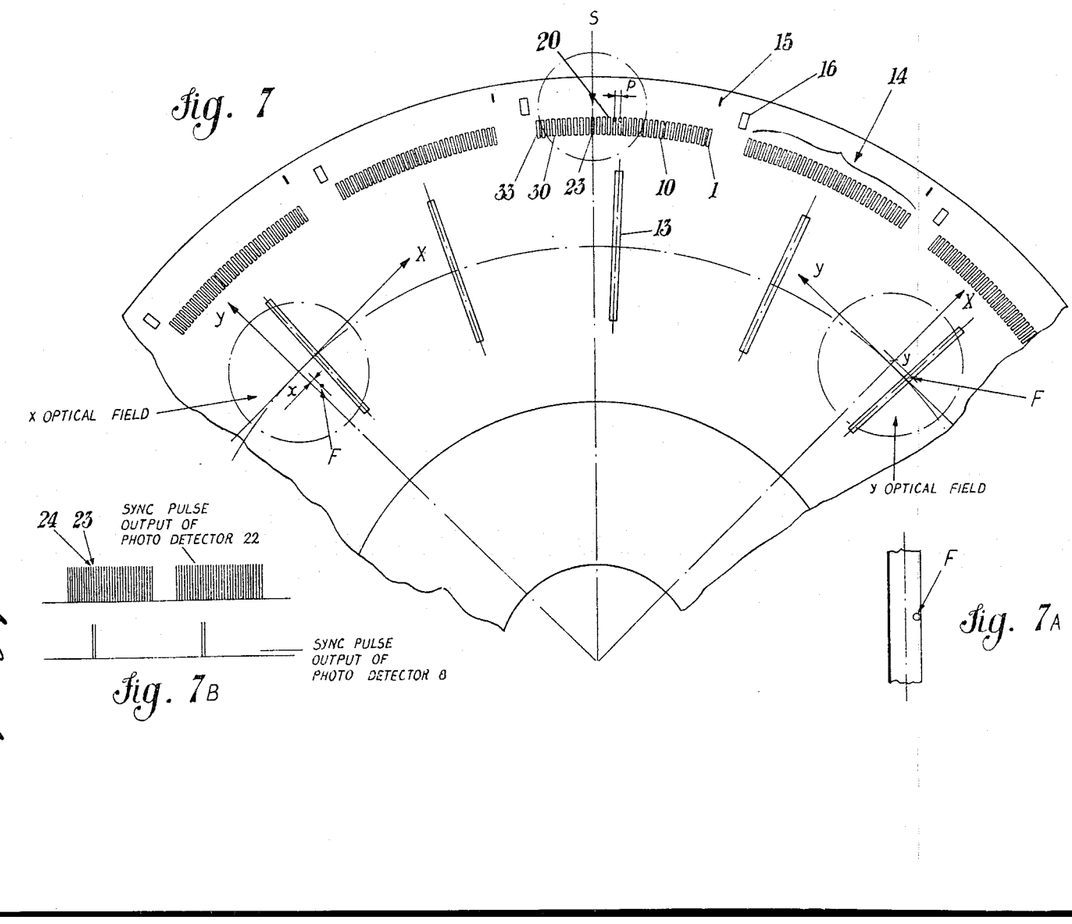
FIG. 7 is a view similar to FIG. 6 but with the point image of the light pulse positioned with different coordinates in the image field.
FIG. 7B is a view of the corresponding sequence of light pulses, synchronism pulses and counting pulses as attained in the example of FIG. 7.

In FIGURES 7 and 7A there is shown a different position of the flash image spot. In this case the scanning slit 13 covers the image spot both when the disc is in the position shown in FIG. 7 and when the disc is in the next one, that is rotated by a pitch $p$, shown in FIGURES 8 and 8A.

Therefore, there are obtained two subsequent output signal pulses from the signal photodetector 8 for each scanning frame, corresponding to the synchronizing pulses 23 and 24 (FIG. 7B).

*Digital processing of the angular position coordinates— processing and readout unit*

The processing of the position coordinates $x-y$ of the image spot F in the relative optical field, is carried out in the digital processing unit comprising the block 11 of FIG. 1.

In this unit, there is merely carried out the arithmetical difference between the flasher synchronizing pulses issuing from the photodetector 22 (FIG. 2) which precede and follow the pulse or pulses of signals picked up, downstream the disc, by the signal photodetector 8.

In the example shown in FIG. 6, the pulses which precede the signal pulse (coinciding with the 26 synchronizing one) are twenty-five in number, while those which follow are seven in number. Their difference eighteen (an even number), represents a number which displayed on a 5-digit binary code plus 1 digit for the sign defines the desired coordinate.

Figures 8, 8A:
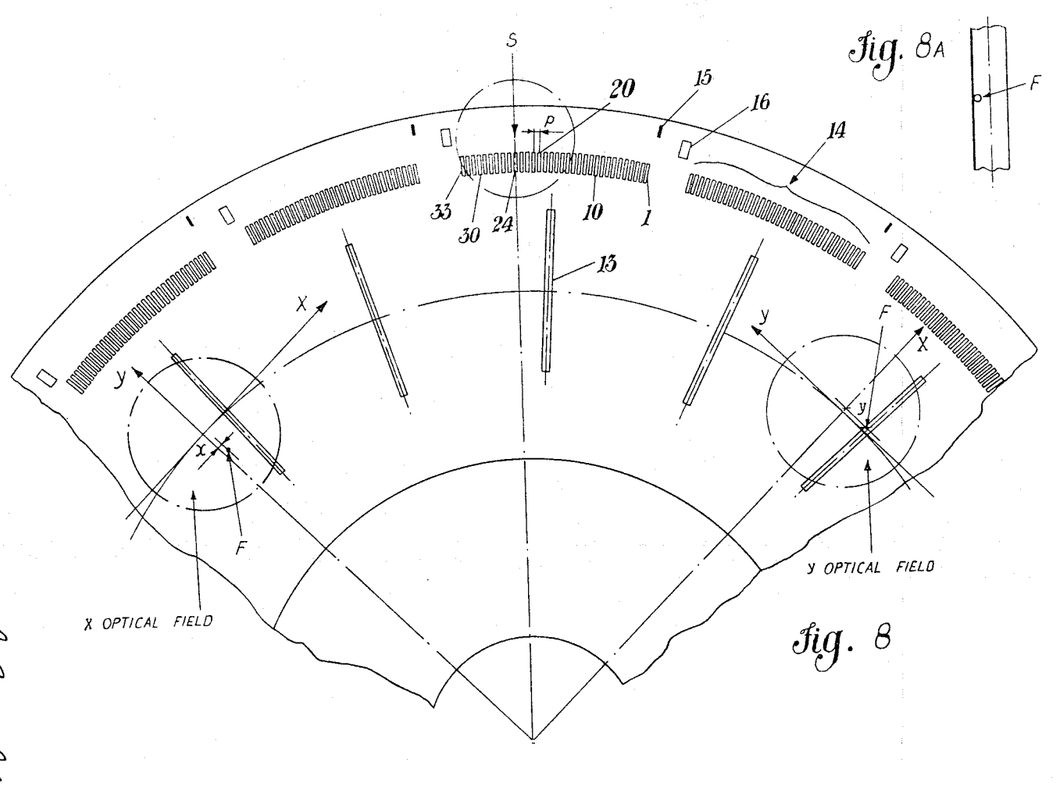
FIG. 8 is a further view similar to FIG. 6 with the image of the light point further displaced.
FIG. 8A is a partial view of FIG. 8 on a greater scale.

In the example shown in FIGURES 7 and 8, the pulses which precede and follow the two signal pulses which have been received are respectively twenty-two and nine in number; their difference is thirteen (an odd number). Therefore, it is understood that, since the synchronizing pulses are thirty-three in number per frame, the positions of the image spot along the coordinates $x$ and $y$ is quantized and detectable by whole numbers between +31 and −31, or, on 5 binary digits plus 1 digit for the sign.

The highest resolution of the system (1 bit) is represented by one half of the angular pitch $p$.

Figure 9:
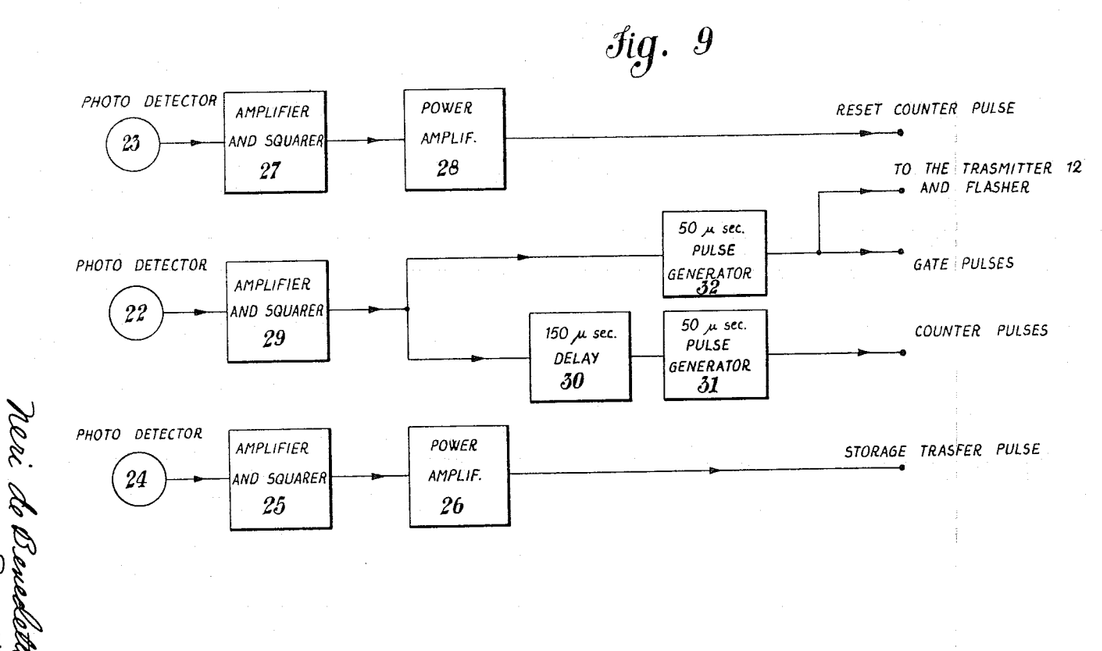
FIG. 9 is a block diagram of the generator of pulse signals synchronized with the rotation of the disc.

In FIG. 9, and with reference also to FIGS. 2 and 2A, there is shown a block diagram of an electronic unit for the amplification and the building up of the synchronizing pulses supplied by the three photodetectors 22, 23 and 24.

As previously stated, the phototransistor 23 supplies a pulse per frame synchronized to the rotation of the disc. Such a pulse precedes the start of the series of the thirty-three flashing and processing synchronizing pulses and is utilized as reset of the bidirectional counters which will be hereinafter described.

The pulse issuing from 23 is amplified and squared by a squarer amplifier 27 and power amplified in a second amplifier 28.

The phototransistor 24 supplies a pulse directly following the series of the thirty-three flashing and processing synchronizing pulses; it is utilized, as it will be explained in the following to transfer in a separate digital storage unit the 5 plus 1 digits relative to the position data $x$ or $y$ available at the end of each scanning frame.

The phototransistor 22 supplies, as stated, the flashing and processing synchronizing pulses. Such, besides being amplified and squared at 29 as the preceding ones, are on one hand delayed by a fixed delay of about 150 microseconds in the monostable multivibrator delay generator 30, followed by a pulse former 31; on another hand formed simply by a pulse former 32.

The delayed pulses pass to the digital computer; the undelayed ones are utilized as gate pulses of the amplifiers of the signal issuing from the signal photodetectors 8 and are also transmitted, as repeatably stated, to the flasher through the transmitter 12 (FIG. 1).

Figure 10:
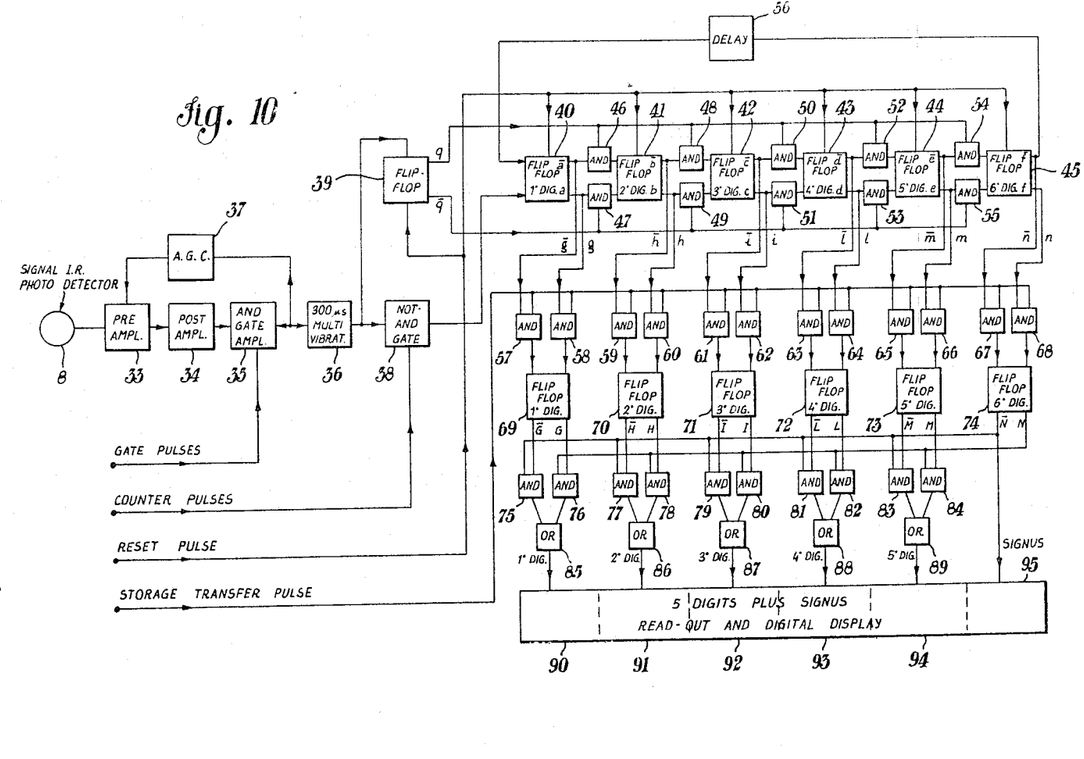
FIG. 10 is a block diagram of the signal amplification and digital computation electronic device, relative to one of the two angular coordinates to be read-out, the device relative to the second coordinate being quite identical.

In FIG. 10 there is shown the block diagram of the electronic device of signal amplification and digital computation of the position coordinate $x$ of the image spot F in the corresponding field of vision.

The device relative to the computation of the coordinate $y$ is quite identical.

The flash pulse signal available downstream the disc, is detected by the photodetector 8; amplified by a low-noise preamplifier 33 gain-controlled by an A.G.C. (automatic gain control) circuit 37.

Next, there is provided also a post-amplifier 34, which is necessary for bringing the pulse to a voltage amplitude sufficient to energize the subsequent AND stage 35; this stage which is well-known in the digital computer electronic art, supplies an output pulse only if there are simultaneously present the signal pulse coming from 34 and the gate pulse; the latter, however, clashing with pulse emitted by the flash owing to the repeatedly mentioned synchronization.

Such a provision improves the capacity of the system to discriminate the useful signal pulses from the background noise and other noise sources or present in the field of vision.

The signal pulse (FIG. 5D) gated in the AND stage 35 releases a monostable multivibrator which forms a pulse of about 300 microseconds, that is having a duration which is two times the delay imparted to the counting pulses in the block 30 of FIG. 10.

Therefore, one has pulse of 300 microseconds for each input signal pulse. This pulse is applied on the set side of a flip-flop 39 and to a NOT-AND stage.

In the latter are also applied the counting pulses; these, owing to said delay of 150 microseconds and the width of 300 microseconds of the signal pulse are centered in the middle of the 300 microsec. pulse issuing from 36.

Figure 5A:
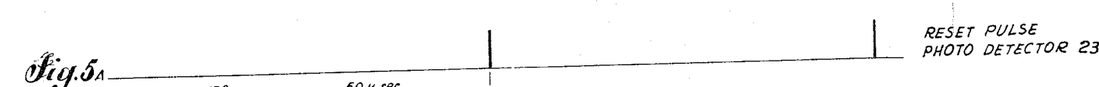
FIGS. 5A–5H are views of the different wave forms present in the different location of the device.
Figures 5B, 5C:
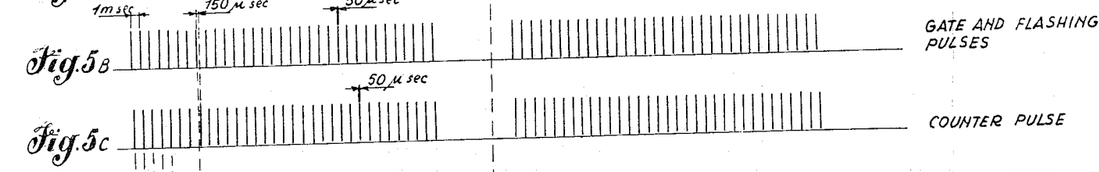
Figure 5D:
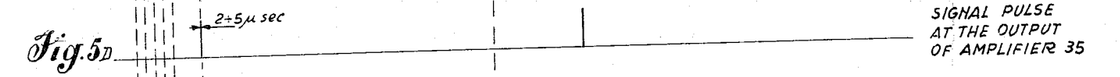

The situation is set out in FIGURES 5B, 5C and 5D where there are shown the waveforms in the different points of the circuit of FIG. 10.

Figures 5E, 5F:
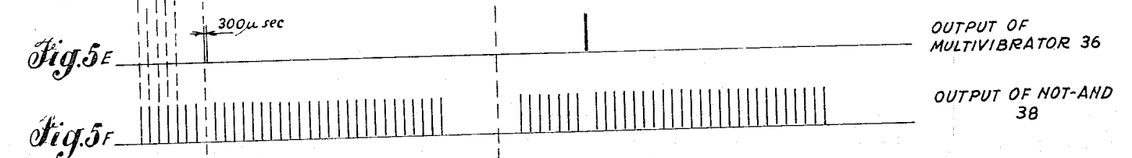

By consequence, in the NOT-AND stage pass all the counting pulses except that or those of the thirty-three pulses coinciding with the signal pulse or pulses being received. In FIG. 5F the output signal from the NOT-AND stage 38 is drawn by the example of a single signal pulse received downstream the disc for each frame.

Figure 5G:
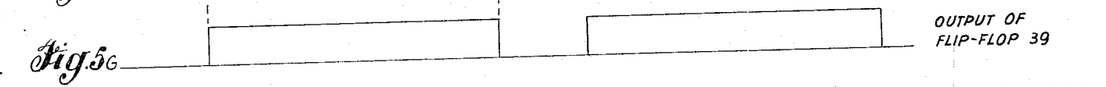

The output signal from the flip-flop 39 is shown in FIG. 5G. This signal corresponds to an Off position of the flip-flop for the time included between the reset pulse (FIG. 5A) generated by the photodetector 23 and the signal pulse (FIG. 5E) and to an On position for the time included between the signal pulse and the reset pulse.

The output waveform from the flip-flop 39 is utilized for discriminating the counting pulses which precede instant of reception of the signal pulse from those following said instant.

The output pulses from the NOT-AND stage 38 (waveform, FIG. 5F) and the output discriminating signal from the flip-flop 39 (waveform, FIG. 5G) energize a bidirectional electronic counter, represented in FIG. 10 by the blocks 40 to 56, of the type well known in the digital art.

A type of such a counter is for example, manufactured by the "Anadex Instruments Inc.," Van Nuys, California, U.S.A For sake of a better clearness I explain that such a counter comprises six cascade binary (flip-flop) scales 40 to 45). The first five scales provide up to 32 digits, the last one the sign. The flip-flops are of the gated type, or they are controlled on the set side by two AND's, the former for the output 1 and the latter for the output 1 of each flip-flop.

All the flip-flops have the electronic reset provided by the reset pulse (FIG. 5A); the (positive or negative) direction of the count depending on the line of propagation of the pulses. If it is the one relative to the outputs $1a$, $b$, $c$, $d$, $e$ of the flip-flops gated by the AND stages 46, 48, 50, 52 and 54, the direction is positive while if it is the one relative to the outputs $1a$, $b$, $c$, $d$, $e$ gated by the AND stages 47, 49, 51, 53 and 55 the direction is negative.

Since the AND line from 46 to 54 is energized by the output $q$ (On) of the selector flip-flop 39, the AND line from 47 to 55 is energized by the output $\bar{q}$ (Off position at the reset instant) it follows that the counter counts with negative sign the pulses which precede the change-over instant of the selector flip-flop 39 (or the instant of reception of the signal pulse), and with negative sign the remaining subsequent ones until the reset pulse of frame close-down.

The output of the counter is on six lines in parallel (five for the absolute value digits and one for the sign).

The output of the last digit (sign), is returned to the input after a suitable delay 56 for the borrow computation.

As it is well known from the theory of this type of digital computation the digits relative to the absolute values of positive numbers are available at the outlet on the parallel lines $g$, $h$, $i$, $l$, $m$ of the counter; those relative to the absolute values of negative numbers, are available at the output on the parallel lines $g$, $h$, $i$, $l$, $m$ of the counter.

Figure 5H:
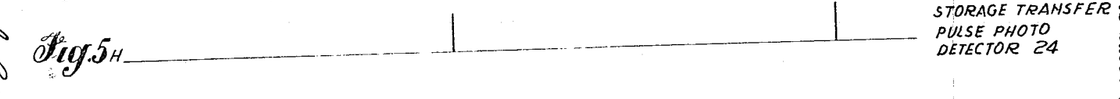

The difference digits thus obtained are transferred, at the frame close-down, to a separate storage unit comprising six flip-flops (from 69 to 74) controlled in parallel by the counter outputs; the transfer onto the storage being controlled by the storage transfer pulse (FIG. 5H) supplied by the photodetector 24 (slit 15 of the disc) through the AND stages from 57 to 68.

The storage is reset with novel data at each frame (1/16 of one revolution of the disc).

The outputs from the storage flip-flops G, H, I, L, M, N are led to a further AND stage (from 75 to 48) followed by an OR (from 85 to 89) where the digit of the sign (output $\bar{N}$ or N of (74)) separates the outputs like G from those like G required for displaying the absolute value of the digit.

Finally, the blocks 90 to 95 are the read-outs of the device, as stated in digital form on five digits plus one digit for the sign 95.

This digital information can be later either recorded by a conventional digital recording system, or carried in into a digital computer for the processing thereof.

*Advantages of the system of the present invention*

From the above detailed description, there clearly appear the advantages of the present invention over other systems of automatic detection of a point light source mentioned at the beginning of this disclosure.

They can be so summerized:

The measuring and computing system of the position coordinates of the image spot on the field of vision is a directly digital one.

This allows the well-known improvement of the digital systems in comparison with the analogical ones from the viewpoint of the sensitivity, noise and consequent resolution, as well as dependence of the precision in relation to variation in outside conditions such as temperatures and inputs.

The available digital information can be directly carried in into a digital computer, for example for the guidance and control of a missile.

The clearance of the scanning slit of the field of vision of the telescopes is equal to $1.5p$, the pitch $p$ being about $1/33$ of the width of the image field. Therefore the width of the slit is only about $1/22$ of the width of the image field. This implies that the equivalent aperture of the lens, as far as the diffused light and resulting background noise are concerned, is reduced by the same ratio, whereas for the image spot which is entirely contained in the width of the slit this reduction is not obtained. (All the rays issuing from the image spot reach the photodetector at the stroboscopic instant in which the flasher emits the light pulse.)

Such a situation leads to a large improvement in the ratio of useful signal to background noise.

The signals coming from the flasher aboard the vehicle to be spotted are of the pulse type having a width of few microseconds (2 to 5 microsec.) at equal emitted average power, a high peak power is obtained, attaining thus signals of very high peak power which allow to remain outside the background and diffused light average noise level.

The pulse signals emitted by flasher are syncronized by the ground equipment and therefore it has been possible to provide a stroboscopic or gated type detection system for detecting these signals with the advantage of energizing the receiver only for a small fraction of the time intervening between a reception pulse and the next one, improving further the discriminating properties of the system with respect to the noise and false signal source.

Finally, the signal detecting, data processing and displaying system, is quite independent of the frequency stability of the disc rotation, since all the operations are entirely synchronized to the rotation and momentary position of the rotary disc and depend exclusively on the pattern firmly engraved thereon.

The present invention has been illustrated and described in one preferred embodiment being however intended that constructive variations might be practically adopted without departing from the scope of the present invention, as defined by the following claims.

I claim:

1. A system for detecting from a ground station in digital form the angular position of an active point-like infrared pulse modulated light source on board of a moving vehicle, comprising in combination a first assembly arranged in the ground station and a second assembly arranged on board of the moving vehicle, said first assembly including two equal telescopes having a common focal plane, for training said light source, an opaque disc having a number of $(4 \times n)$ of said equispaced radial scanning slits, a number of $(4 \times n)$ sets of $(2^m + 1)$ equispaced radial synchronizing slits symmetrically arranged above said scanning slits with the central slit lying in alignment with the corresponding scanning slit, said synchronizing slits having a pitch one from another corresponding to twice their width, the width of the scanning slit being 1.5 times the pitch of the synchronizing slits, on a radius greater than that of said synchronizing slits, there being provided $(4 \times n)$ large slits each arranged two pitches before the first synchronizing slit of each set thereof, counting in the rotation direction of said disc and on a radius greater than that of said large slits, there being provided $(4 \times n)$ small slits each arranged one pitch after the last synchronizing slit of each set thereof, counting in the rotation direction of said opaque disc, the figure $n$ corresponding to an even number between 2 and 10, two photodetectors each arranged on the optical axis of the corresponding telescope of said two telescopes for detecting the light pulse of said light source and transforming it to an electric pulse, said two telescopes being parallel to one another and arranged with their axes passing through the radius circle of said scanning slits, opto-electronic means for generating electric pulse signals synchronized to the rotation of said disc-like means, digital computing electronic means for processing and displaying in digital form the electric pulses sent from said photo-detector means and the synchronized electric pulses sent from said opto-electronic means, and transmitter means for transmitting to the moving vehicle said synchronized electronic pulses, said second assembly on the moving vehicle including receiver means for receiving said synchronized pulses, modulating means for modulating the pulses transmitted from said receiver means and causing the lighting of said light source in accordance with said synchronized pulses and power supply means for energizing said modulating means and said light source, whereby the measurement of the angular coordinate of the position of the moving body with respect to the collimation axis of the telescope is obtained in digital form by effecting the numerical difference of synchronism pulses generated by said opto-electronic means by rotating of said disc, which precede and follow the reception instant of the light pulse signals from said infrared light source on the vehicle, said signals going through said scanning slits.

2. A system as claimed in claim 1, wherein said opto-electronic means consists of an electric lamp arranged perpendicularly to said disc to illuminate said synchronizing slits, large slits and small slits, a first, a second and a third photo-transistor arranged in correspondence of said electric lamp at the opposite site of said disc and a projection lens for projecting the light pulses obtained at the rotation of said disc from said electric lamp onto said photo-transistors, whereby the light pulses coming from said scanning slits, large slits and small slits will be transformed respectively by the corresponding photo-transistor into electric pulses.

3. A system as claimed in claim 1, wherein said digital difference of the synchronism pulses preceding and following the reception instant of the light pulse signals from said infrared light source on the vehicle is obtained by electronic digital computing means consisting of a bi-directional digital computer by which said pulses preceding the reception instant of said light pulse signal are computed in the positive sense and said pulses following the reception instant of said light pulse signals are computed in the negative sense, the reversal of the computing sense being controlled by the light signal pulse from the image of said light source.

4. A system as claimed in claim 2, wherein the electric pulses coming from said first photo-transistor and corresponding to the light pulses of said large slits are amplified and squared in the first squarer-amplifier device, power-amplified in a first power amplifier and employed in said digital computing means as reset counter pulses, the electric pulses coming from said second photo-transistor and corresponding to the light pulses coming from said synchronizing slits being amplified and squared in a second squarer-amplifier supplying outputs transmitted to a first pulse generator and through a monostable multivibrator delay generator to a second pulse generator supplying output pulses transmitted respectively to said transmitter as synchronism pulses and to said computing means as counter pulses, and the electric pulses coming from said third photo-transistor and corresponding to the light pulses of said small slits being amplified and squared in a third square amplifier device and then power amplified in a second power amplifier device, supplying output to said digital computer as storage transfer pulses.

5. A system as claimed in claim 4, wherein binary digital code outputs of said bidirectional computer are transmitted one time for $1/4 \times n$ rotation of said rotary disc for each frame to a digital memory controlled by a memory transfer pulse emitted from said third photo-transistor to be employed as an indication of position and alignment data of the movable vehicle with respect of the collimation axes of said telescopes.

References Cited by the Examiner

UNITED STATES PATENTS 2,961,545  11/1960  Astheimer et al. ______ 88—1 X
3,002,096  9/1961  Eckweiler et al. ______ 88—1 X

FOREIGN PATENTS 603,321  6/1948  Great Britain.

JEWELL H. PEDERSEN, *Primary Examiner.*
W. L. SIKES, *Assistant Examiner.*